US008621503B2

(12) United States Patent
Marin et al.

(10) Patent No.: US 8,621,503 B2

(45) Date of Patent: Dec. 31, 2013

(54) APPARATUSES, SYSTEM, METHOD, AND STORAGE MEDIUM FOR CROWD GAME

(75) Inventors: Veli-Pekka Marin, Turku (FI); Heikki Aura, Helsinki (FI); Jussi Marin, Turku (FI); Ilkka Paananen, Helsinki (FI); Mikko Kodisoja, Espoo (FI); Hannu Virta, Turku (FI); Aapo Bovellan, London (GB); Ari Jantunen, Riihimäki (FI); Petri Bäckström, Espoo (FI)

(73) Assignee: Uplause Oy, Turku (FI)

( * ) Notice: Subject to any disclaimer, the term of this patent is extended or adjusted under 35 U.S.C. 154(b) by 141 days.

(21) Appl. No.: 12/821,437

(22) Filed: Jun. 23, 2010

(65) Prior Publication Data

US 2011/0321074 A1 Dec. 29, 2011

(51) Int. Cl.

| | |
|---|---|
| ***H04H 60/33*** | (2008.01) |
| ***H04N 7/16*** | (2011.01) |
| ***H04N 7/173*** | (2011.01) |
| ***G06F 19/00*** | (2011.01) |

(52) U.S. Cl.

USPC ...... 725/24; 725/9; 725/12; 725/23; 725/135; 700/91; 700/92

(58) Field of Classification Search

USPC ........ 348/54

See application file for complete search history.

(56) References Cited

U.S. PATENT DOCUMENTS

| | | | | |
|---|---|---|---|---|
| 5,545,088 | A * | 8/1996 | Kravitz et al. | 463/40 |
| 5,993,314 | A * | 11/1999 | Dannenberg et al. | 463/1 |
| 2002/0165630 | A1 * | 11/2002 | Arthur et al. | 700/91 |
| 2003/0148806 | A1 * | 8/2003 | Weiss | 463/20 |
| 2006/0063587 | A1 * | 3/2006 | Manzo | 463/25 |
| 2010/0079585 | A1 * | 4/2010 | Nemeth et al. | 348/54 |
| 2010/0194892 | A1 * | 8/2010 | Hikita et al. | 348/157 |

* cited by examiner

*Primary Examiner* — Justin Shepard

(74) *Attorney, Agent, or Firm* — Buchanan Ingersoll & Rooney PC

(57) ABSTRACT

Apparatuses, system, method, and storage medium for crowd game are disclosed. A series of missions forming a crowd game are outputted to a display device, each mission specifying a task for spectators of an event. A result for a mission is determined on the basis of participation and/or reaction by the spectators for the task. A total result for the crowd game is determined on the basis of the results for the missions.

20 Claims, 8 Drawing Sheets

CLIENT APPARATUS 100
PROCESSOR 102
MISSION OUTPUT 104
MISSION RESULT DETERMINATION 106
TOTAL RESULT DETERMINATION 108
NON-VOLATILE MEMORY 110
CROWD GAME DATA 112
MISSION DATA 114
USER INTERFACE 116
PULSE BASED SCORING 118
ANALYZER INPUT IF 120
SOUND OUTPUT IF 122
VIDEO OUTPUT IF 124
COMM IF 126
LOUDSPEAKER SYSTEM 128
CHANT LOUDER! 130
DISPLAY DEVICE 132
MISSION FOR TEAM FINLAND: CHANT TEAM NAME! 134
MISSION RESULT: 100% 136
TOTAL RESULT: TEAM FINLAND WINS! 138
ADVERTISEMENT 140
SOUND LEVEL METER 142
MICROPHONE 144
VIDEO CAMERA 146
MOTION DETECTION METER/ANALYZER 148
150
FINLAND! 152
154
156
158
160
162
CLAP-CLAP! 164
166
168
SPECTATORS 170

APPARATUSES, SYSTEM, METHOD, AND STORAGE MEDIUM FOR CROWD GAME

FIELD

The invention relates to a crowd game, implemented by various apparatuses, a system, a method, or a computer-readable storage medium including computer program instructions.

BACKGROUND

As events are broadcasted live over various media such as television, the motivation for spectators to participate in the actual event may decrease. Spectators of an event have been entertained by single animations or video clips. However, further sophistication of such entertainment may be desirable in order to attract attendance.

BRIEF DESCRIPTION

The present invention seeks to provide improved apparatuses, an improved system, an improved method, and an improved computer-readable storage medium.

According to an aspect of the present invention, there is provided an apparatus as specified in claim 1.

According to another aspect of the present invention, there is provided another apparatus as specified in claim 17.

According to another aspect of the present invention, there is provided an improved system as specified in claim 18.

According to another aspect of the present invention, there is provided an improved method as specified in claim 19.

According to another aspect of the present invention, there is provided an improved computer-readable storage medium as specified in claim 20.

LIST OF DRAWINGS

Embodiments of the present invention are described below, by way of example only, with reference to the accompanying drawings, in which FIGS. 1, 3, 4, and 5 illustrate various embodiments of a client apparatus;

DESCRIPTION OF EMBODIMENTS

The following embodiments are exemplary. Although the specification may refer to "an" embodiment in several locations, this does not necessarily mean that each such reference is to the same embodiment(s), or that the feature only applies to a single embodiment. Single features of different embodiments may also be combined to provide other embodiments.

FIGS. 1 to 7 illustrate embodiments of various apparatuses 100, 530. FIGS. 1 to 7 only show some elements and their implementation may differ from what is shown. The connections shown in FIGS. 1 to 7 are logical connections; the actual physical connections may be different. Interfaces between the various elements may be implemented with suitable interface technologies, such as a message interface, a method interface, a sub-routine call interface, a block interface, or any means enabling communication between functional sub-units. It should be appreciated that the apparatuses 100, 530 may comprise other parts. However, such other parts are irrelevant to the actual invention and, therefore, they need not be discussed in more detail here. It is also to be noted that although some elements are depicted as separate ones, some of them may be integrated into a single physical element. The specifications of the apparatuses 100, 530 may develop rapidly. Such development may require extra changes to an embodiment. Therefore, all words and expressions should be interpreted broadly, and they are intended to illustrate, not to restrict, the embodiments.

Figure 1:
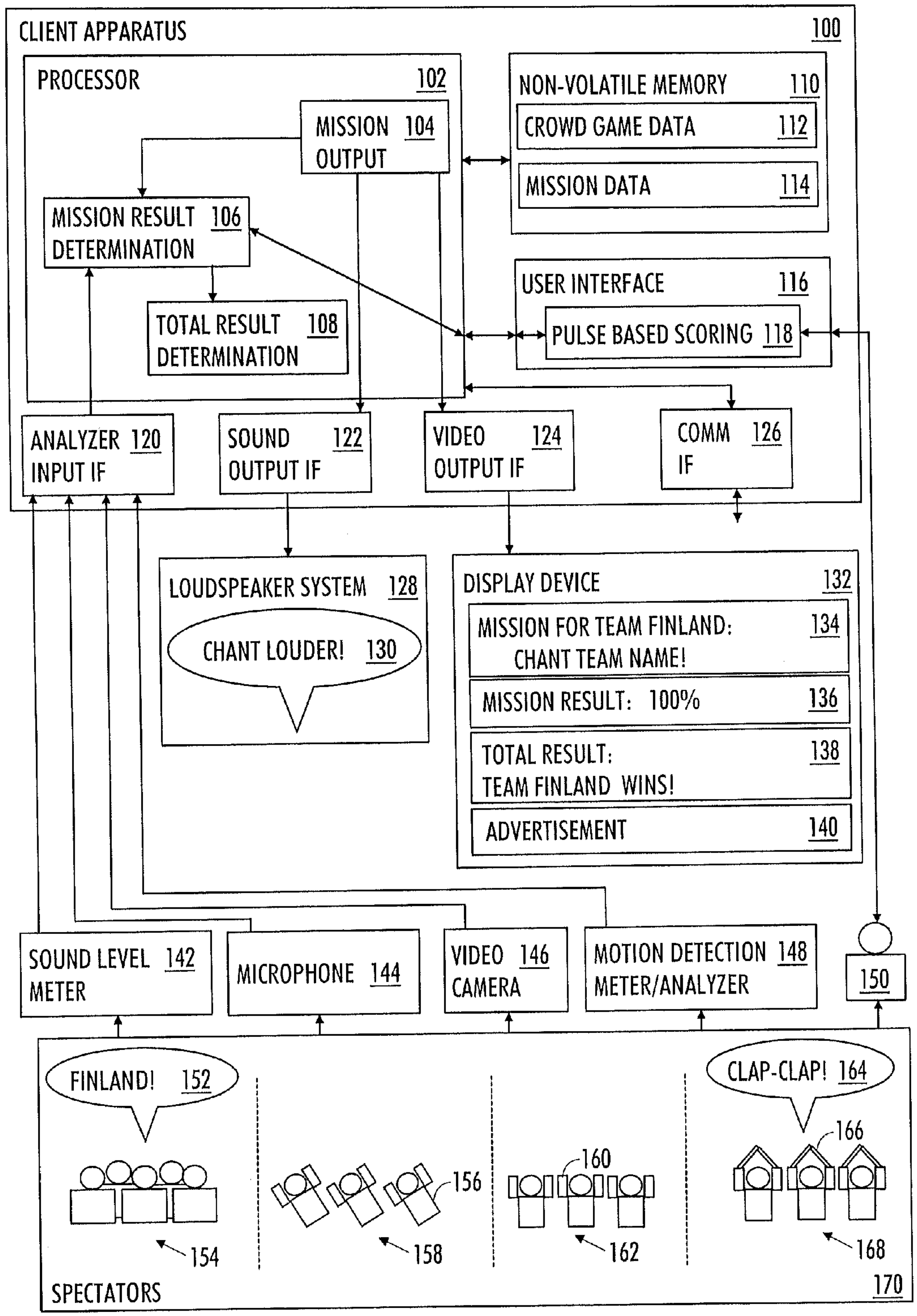
Figure 2:
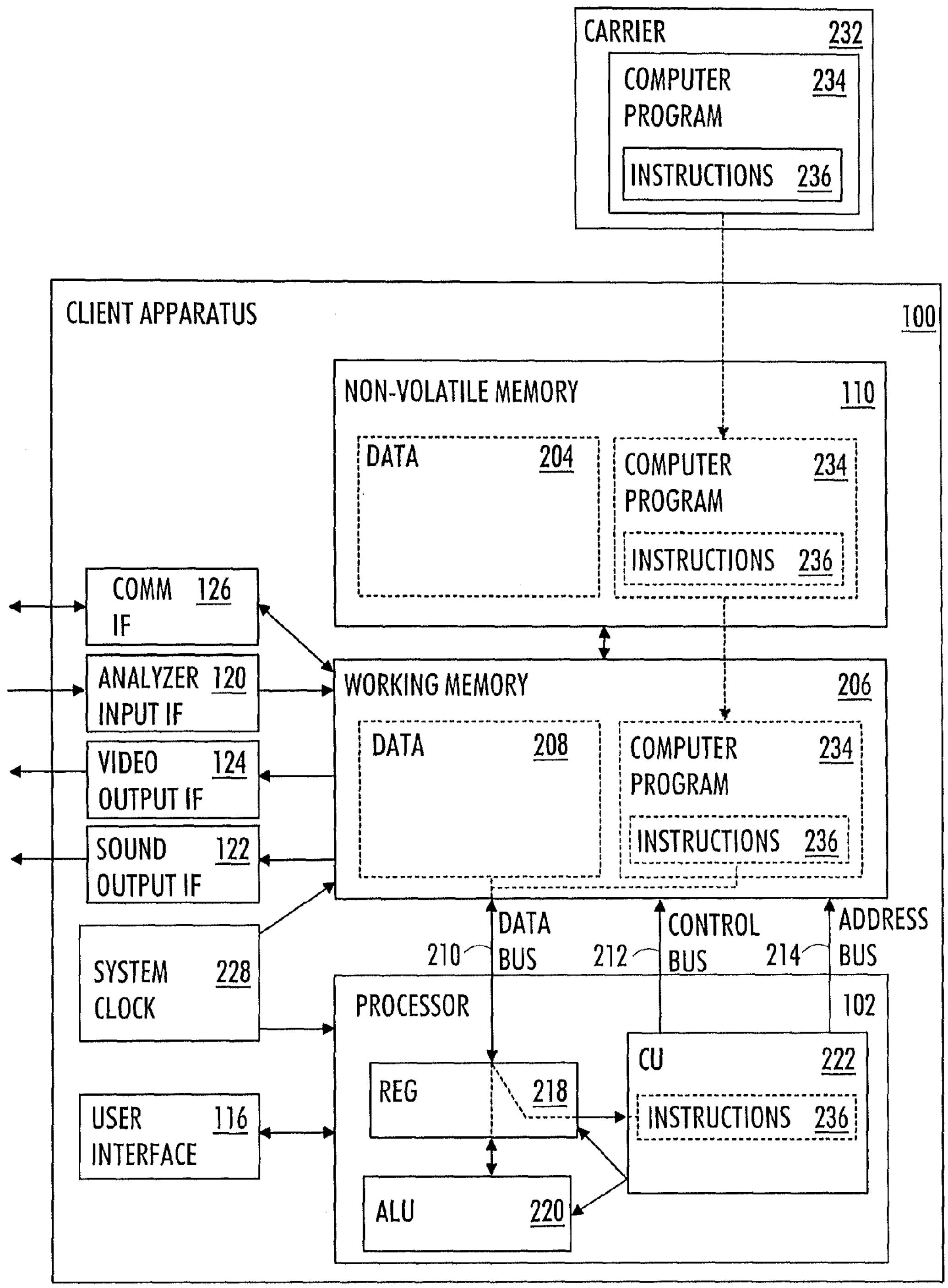
FIG. 2 illustrates implementation of the client apparatus as a computer.

With reference to FIGS. 1 and 2, a client apparatus 100 is described. The client apparatus comprises a processor 102, and a memory 206 including computer program 234 instructions 236. The memory 206 and the computer program 234 instructions 236 are configured to, with the processor 102, cause the client apparatus 100: to output 104 a series of missions forming a crowd game to a display device 132, each mission specifying a task for spectators 170 of an event; to determine 106 a result for a mission on the basis of participation and/or reaction by the spectators 170 for the task; and to determine 108 a total result for the crowd game on the basis of the results for the missions. The crowd game is played by the spectators 170 of a spectator event. The spectator event may relate to spectator sports, but it may also be another type of public gathering, such as a concert, a song contest, a large company event, or any other event. The scale does not matter; there may be ten spectators or one million spectators, or any other number of spectators. Typical spectator sports are American football, soccer, rugby, ice hockey, basketball, baseball, cricket, NASCAR, Formula One, some other motorsport, alpine skiing, golf, tennis etc. The spectators 170 may be fans of a specific team, or of a specific athlete, for example.

Social media and communities continue to grow. There is a clear trend that social features will be built into almost all businesses. Sports and events are by nature social but there are still lots of potential to put the fans into the center and improve the social experience. People also want to be rewarded and recognized for what they do. The crowd game will allow the audience to be the stars at the event and entertain themselves via game on the big video screen 132. The crowd game is actually creating a totally new type of game genre played by thousands of people simultaneously in a single location making it a really unique product never seen before.

The crowd game differs from standard big screen animations and video clips developed by clubs themselves by providing much more holistic and unified experience. Also, the possibility to have the same software used by several clubs and across a league offers great possibilities for comparing the different clubs, arena results and atmosphere, something that may happen only if the same core software is provided in multiple locations.

The basic idea of the crowd game is to entertain and activate spectators to participate more in the event by using the big screens 132 as the medium for the game play. The game itself follows a normal game storyline, with clearly scripted and designed crowd missions and tasks. Some of the tasks may be simple ones like by using an animation to challenge the crowd 170 to make as loud noise as they can or to clap their hands for support.

As it is a game, there may also be a score and potential reward for good performance. Each mission gives a certain score, which is based on percentages on 0-100% scale, for example. For example, in a hockey game in each of the three periods there would be three to five missions. Total score and performance would be then calculated based on the average of all crowd missions. Scores are more fun if there is a way to reference them. For this reason leader boards, hall of frames and other ways to compare scores between different events, clubs and sports are included in the game design.

Each event is unique, and, therefore, some adjustment may be needed based on amount of spectators 170 in the arena, importance of game, identity of the team etc. It is the role of a game operator 150 to drive the game tasks, as it is most suitable for that particular event. There may be also tailored tasks or bonus missions driven based on the performance of the crowd 170.

The crowd game software includes a very simple and easy to use control panel for the game operator 150 at the event. This control panel will allow the operator 150 to change big screen 132 game tasks easily as well as adjust scores and drive results. The software may be run from a laptop computer that is connected to video screen equipment (video mixer) in order to get output to the video screen 132 at the arena.

The crowd game software client may have connectivity features that enable two-way communication with a backend server. This will allow client software to upload data to server, to fetch data like statistics from the server and display them at the event to the audience. This feature actually means that the crowd game extends to multiple event locations that are live at the same time. Audiences 170 at different locations may compete in the crowd game and results may be shown and compared in real-time manner. This kind of experience and software has never been created or used before.

The crowd game extends also to an advertising platform that is incorporated into the crowd game software. This platform allows brands and products to be displayed within crowd game missions. This in-game ad system will create new medium for advertisers and sponsors to find their target audiences in a new way.

In general, the client apparatus 100 may be an electronic digital computer which may comprise, besides the processor 102 and the working memory 206, a system clock 228. Furthermore, the computer 100 may comprise a number of peripheral devices. In FIG. 2, some peripheral devices are illustrated: a non-volatile memory 110, a communications interface 126, an analyzer input interface 120, a video output interface 124, a sound output interface 122, and a user interface 116 (such as a pointing device, a touch pad, a touch screen, a keyboard, a display, etc.). Naturally, the computer 100 may comprise a number of other peripheral devices not illustrated here for the sake of clarity.

The system clock 228 constantly generates a stream of electrical pulses, which cause the various transferring operations within the computer 100 to take place in an orderly manner and with specific timing.

Depending on the processing power needed, the computer 100 may comprise several (parallel) processors 102, or the required processing may be distributed amongst a number of computers 100. The computer 100 may be a laptop computer, a personal computer, a server computer, a mainframe computer, or any other suitable computer.

The term 'processor' refers to a device that is capable of processing data. The processor 102 may comprise an electronic circuit or electronic circuits implementing the required functionality, and/or a microprocessor or microprocessors running computer program 234 instructions 236 implementing the required functionality. When designing the implementation, a person skilled in the art will consider the requirements set for the size and power consumption of the client apparatus 100, the necessary processing capacity, production costs, and production volumes, for example. The electronic circuit may comprise logic components, standard integrated circuits, application-specific integrated circuits (ASIC), and/or other suitable electronic structures.

The microprocessor 102 implements functions of a central processing unit (CPU) on an integrated circuit. The CPU 102 is a logic machine executing computer program 234 instructions 236. The program instructions 236 may be coded as a computer program 234 using a programming language, which may be a high-level programming language, such as C, or Java, or a low-level programming language, such as a machine language, or an assembler. The CPU 102 may comprise a set of registers 218, an arithmetic logic unit (ALU) 220, and a control unit (CU) 222. The control unit 222 is controlled by a sequence of program instructions 236 transferred to the CPU 102 from the working memory 206. The control unit 222 may contain a number of microinstructions for basic operations. The implementation of the microinstructions may vary depending on the CPU 102 design. The microprocessor 102 may also have an operating system (a general purpose operating system, a dedicated operating system of an embedded system, or a real-time operating system, for example), which may provide the computer program 234 with system services.

There may be three different types of buses between the working memory 206 and the processor 102: a data bus 210, a control bus 212, and an address bus 214. The control unit 222 uses the control bus 212 to set the working memory 206 in two states, one for writing data into the working memory 206 and the other for reading data from the working memory 206. The control unit 222 uses the address bus 214 to send to the working memory 206 address signals for addressing specified portions of the memory in writing and reading states. The data bus 210 is used to transfer data 208 from the working memory 206 to the processor 102 and from the processor 102 to the working memory 206, and to transfer the instructions 236 from the working memory 206 to the processor 102.

The working memory 206 may be implemented as a random-access memory (RAM), where the information is lost after the power is switched off. The RAM is capable of returning any piece of data in a constant time, regardless of its physical location and whether or not it relates to a previous piece of data. The data 208 may comprise crowd game data 112 and mission data 114, any temporary/permanent data needed during the processing, and computer program 234 instructions 236 etc.

The non-volatile memory 110 retains the stored information even when not powered. Examples of non-volatile memory 110 include read-only memory (ROM), flash memory, magnetic computer storage devices, such as hard disk drives, and optical discs.

An embodiment provides a computer-readable storage medium 232 comprising computer program 234 instructions 236 which, when loaded into the client apparatus 100, cause the client apparatus 100 to perform: to output a series of missions forming a crowd game to a display device, each mission specifying a task for spectators of an event; to determine a result for a mission on the basis of participation and/or reaction by the spectators for the task; and to determine a total result for the crowd game on the basis of the results for the missions.

The computer program 234 may be in a source code form, object code form, or in some intermediate form. The computer program 234 may be stored in a carrier 232, which may be any entity or device capable of carrying the program to the client apparatus 100. The carrier 232 may be implemented as follows, for example: the computer program 234 may be embodied, besides computer-readable storage medium, on a record medium, stored in a computer memory, embodied in a read-only memory, carried on an electrical carrier signal, carried on a telecommunications signal, and/or embodied on a software distribution medium. In some jurisdictions, depending on the legislation and the patent practice, the carrier 232 may not be a telecommunications signal.

FIG. 2 illustrates that the carrier 232 may be coupled to the client apparatus 100, whereupon the program 234 comprising the program instructions 236 is transferred into the non-volatile memory 110 of the client apparatus 100. The program 234 with its program instructions 236 may be loaded from the non-volatile memory 110 into the working memory 206. During running of the program 234, the program instructions 236 are transferred via the data bus 210 from the working memory 206 into the control unit 222, wherein usually a portion of the instructions 236 resides and controls the operation of the apparatus 100.

There are many ways to structure the program 234. The operations of the program may be divided into functional modules, sub-routines, methods, classes, objects, applets, macros, etc., depending on the software design methodology and the programming language used. The division divides the desired functionality into separately programmable parts. As illustrated in FIG. 1, the program 234 may be structured as a collection of parts 104, 106, 108. In modern programming environments, there are software libraries, i.e. compilations of ready made functions, which the program may utilize for performing a wide variety of standard operations. Besides the basic entities described earlier, there may be a number of other, supplementary entities. Data 204 which comprises crowd game data 112 and mission data 114 may be brought into the working memory 206 via the non-volatile memory 110 or via the communications interface 126. There may be a further software entity for this operation. The data 204 may have been brought into the non-volatile memory 110 via a memory device (such as a memory card, an optical disk, or any other suitable non-volatile memory device) or via a telecommunications connection (via Internet, or another wired/wireless connection) through the communications interface 126. Various interfaces 120, 122, 124 may be implemented by a suitable communication bus, such as USB (Universal Serial Bus) or some other serial/parallel bus, operating in a wireless/wired fashion. The interfaces 120, 122, 124 may be directly coupled to external devices, or there may be a telecommunications connection between the interfaces 120, 122, 124 and the external devices.

Now that the basic structure of the client apparatus 100 has been described, its functionality may be studied in detail. The main functionality includes three parts: mission output 104, mission result determination 106, and the total result determination 108.

In an embodiment, the memory 206 and the computer program 234 instructions 236 are further configured to, with the processor 102, cause the client apparatus 100: to output the series of missions forming the crowd game to the display device 132 under control of the user interface 116 and via the video output interface 124. This control highlights the fact that the crowd game may be of such nature that it is not possible to automate all stages of it, but it is supervised and sequenced by the trained and skilled human operator 150 observing the spectators 170.

In the first part 104, the series of missions forming the crowd game is outputted from the client apparatus 100 to the display device 132 via the video output interface 124. Each mission specifies a task for the spectators 170 of the event. As shown in FIG. 1, the task 134 for the fans of Team Finland is displayed on the display device 132: chant the name of the team. The task may be aimed for all spectators 170 or a part of the spectators 170. The spectators 170 may be divided into groups with various criteria. One group may include supporters of one team, and the other group may include supporters of the other team, for example. The task is designed in such a manner that it induces participation and/or reaction by all spectators 170 or some part of the spectators 170.

The display device 132 may be an electronic visual display, for example. Electronic visual display may be observed directly (direct view display) or the displayed information may be projected to a screen (transmissive or reflective screen). Visual information is generated according to the electrical input signal (analog or digital) either by generation of light (active displays) or, alternatively, by modulation of available light during the process of reflection or transmission (passive displays). A wide array of implementation techniques is available for the electronic visual displays: LCD (liquid crystal display), electroluminescence, plasma display panel, LED (light emitting diode) display, OLED (organic light emitting diode) etc. Any technology suited for displaying information to the spectators 170 of the event may be used.

Besides outputting the mission to the display device 132, other ways to communicate with the spectators 170 may be utilized as well. In an embodiment, the memory 206 and the computer program 234 instructions 236 are further configured to, with the processor 102, cause the client apparatus 100: to output sound information 130 relating to the mission to a loudspeaker system 128 through the sound output interface 122. Basically, loudspeaker is an electroacoustic transducer that converts electrical signal into sound: loudspeaker moves in accordance with the variations of the electrical signal and causes sound waves to propagate through the air. The loudspeaker system 128 may utilize any suitable technology and it is dimensioned according to the space the spectators 170 accommodate. The sound information 130 may be fetched from a prerecorded file, stored in the non-volatile memory 110, for example. Other option is that the sound information 130 is direct live talk, by the human operator 150, for example. In the example of FIG. 1, the sound information 130 urges, during the task, the spectators 154 to chant louder the team name.

Figure 9:
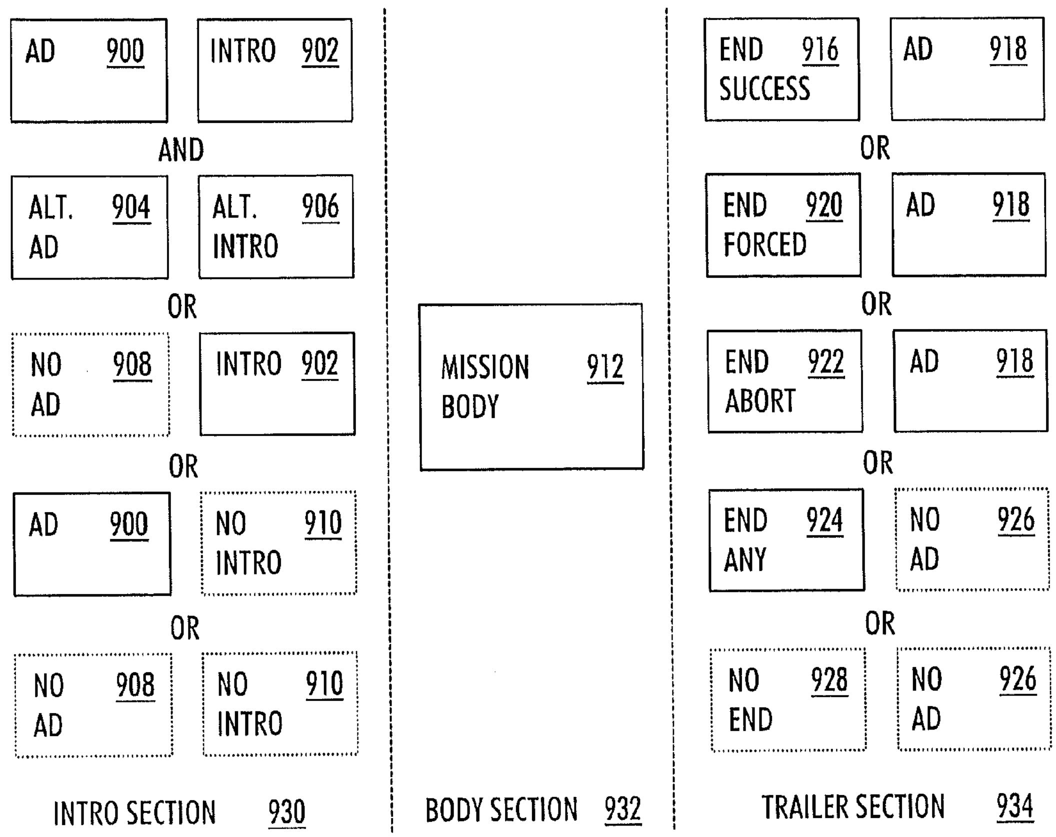
FIG. 9 illustrates various mission structures.

With reference to FIG. 9, the structure of the mission will next be explained. Basically, each mission may comprise three parts, an intro section 903, a body section, and a trailer section 934. Besides specifying the task for the spectators 170, the mission may include advertisement. In an embodiment, the memory 206 and the computer program 234 instructions 236 are further configured to, with the processor 102, cause the client apparatus 100: to output together with the mission an advertisement relating to a brand and/or a product and/or a service to the display device 132. Naturally, the sound of the advertisement may be played through the loudspeaker system 128.

The intro section 930 begins the mission. The intro section 930 may contain an advertisement 900, or a number of advertisements, and an intro 902 for the mission. The intro 902 may include the name of the mission, and possibly also instructions/tutorial relating to the mission. As shown in FIG. 1, the intro 902 may be shown 134 on the display device 132: "Mission for Team Finland: Chant team name!". The advertisement(s) 900 may be shown 140 simultaneously on the display device 132, or sequentially, sequenced together with the intro 902. For the same mission, there may be an alternative advertisement 904, and an alternative intro 906. The alternative intro 906 may be, for example: "Mission for Team Canada: Chant team name!". The alternative advertisement (s) 904 and the alternative intro(s) 906 may be available for the operator 150 to choose manually instead of the default advertisement 900 and intro 902.

Alternatively, the intro section 930 may contain no advertisement 908, and only the intro 902, or, the other way round: only the advertisement 900, and no intro 910. In some cases, the intro section 930 may contain no advertisement 908, and no intro 910.

The body section 932 contains the mission body 912, i.e. the output during the task performed by the spectators 170. The mission body 912 may be a passive content such as an animation or a video clip, or interactive content such as a game. The mission body 912 may contain suitable visual (and possibly also audio) information such as video, pictures, animation etc. One example of such information is shown in FIG. 1: mission result 136 is shown on the display device 136 in a live fashion, i.e. the development of the result 136 is shown in real-time during the mission. In the example, the mission result 136 has achieved 100%, in other words, Team Finland has chanted the team name in such a fashion that it has achieved the highest possible score.

The trailer section 934 ends the mission with several possible combinations: end success 916 with an advertisement(s) 918, end forced 920 with the advertisement(s) 918, or end abort 922 with the advertisement(s) 918, or any of the three possible endings (success/forced/abort) 924 with no advertisement 926. In some cases, the trailer section 934 may contain no end 928, and no advertisement 926. End success 916 is a normal (default) ending with a result. End forced 920 is an abnormal (premature) ending due to the operator 150 or system intervention with a result (whatever applies to the mission). End abort 922 is an abnormal (premature) ending due to the operator 150 or system intervention without a result (mission interrupted).

In the second part 106, the result for the mission is determined on the basis of the participation and/or the reaction by the spectators 170 for the task. This second part 106 gives another requirement for the task of the mission: the participation and/or the reaction by the spectators 170 induced by the task is measurable. The participation and/or reaction by the spectators 170 may comprise sounds 152 generated by the spectators 154: the supporters 154 of Team Finland may chant the team name as required in the task 134, for example. Alternatively, or additionally, the participation and/or reaction by the spectators 170 may comprise body movements 156 of the spectators 158, body part movements 160 of the spectators 162, and/or handling of accessories 166 by the spectators 168. The body movements 156 and/or body part movements 160 may be synchronized in order to produce the so-called audience wave. The accessories 166 may include any type of accessory that is safe to use in a mass event. The accessory 166 may produce sound, or movement, for example. In FIG. 1, the accessories 166 are so-called thundersticks, i.e. inflated plastic batons including air chambers inside to amplify the sound as the spectators 168 strike them together in a clapping motion. Accordingly, besides the motion generated by the thundersticks, also the sound 164 produced by them may be measured. The accessories 166 may also be oversized foam fingers or hands, towels, flags, accessories provided in the event etc.

The result for the mission is determined on the basis of the participation and/or the reaction by the spectators 170 for the task, i.e. the participation and/or reaction is measured.

In an embodiment, the memory 206 and the computer program 234 instructions 236 are further configured to, with the processor 102, cause the client apparatus 100: to determine the result for the mission in such a manner that a human operator 150 sets the result with the user interface 116 on the basis of observing the participation and/or reaction by the spectators 170. Such measurement is based on human evaluation, which may be performed according to some predetermined rules or a heuristic evaluation of the observed participation and/or reaction. The scale may be relatively coarse, such as a four-point scale: poor, medium, good, excellent.

In an embodiment, the client apparatus 100 further comprises a pulse-based scoring user interface 118, and the memory 206 and the computer program 234 instructions 236 are further configured to, with the processor 102, cause the client apparatus 100: to receive scores in such a manner that the human operator 150 rates the participation and/or reaction by the spectators 170 with scores during the mission in real-time with the pulse-based scoring user interface 118; and to determine the result for the mission on the basis of the scores for the mission.

The pulse based-scoring may comprise two simultaneously working layers: a base layer and a buffer layer. These two layers work in an overlapping fashion but have different functions. The function of the base layer is to provide static score data and, consequently, it is not editable. The function of the buffer layer is to provide dynamic score data, and, consequently, it may be edited.

The base layer is the data foundation of the pulse-based scoring providing real time scoring data in every loop. Base layer scoring data is only stored for the scoring database of the game software. Base layer scoring data is static information.

The buffer layer is the data filter of the base layer's scoring database. Its main function is to provide scoring data, and, consequently, it is dynamic information. The buffer layer also converts the data to desired score attribute units.

A percentile score may be provided by the dual layer system. The percentile score may be converted to a desired attribute unit or units, such as symbols, numeral attributes, or verbal attributes. If the percentile score is 75%, for example, it may be expressed as a colored portion of five stars (three stars are fully colored, and one star is partly colored, of a symbol illustrating five stars), as a numeral attribute "7500 POINTS", or as a verbal attribute "GREAT EFFORT".

There may be four variations to mission scoring. All four types have the dual layer scoring as the foundation, and they only differ in the characteristics of the pulse specification. The four mission types are:

1. Unit missions. Goal is to achieve the highest possible unit level by shouting or making noise. Basically, this may be seen as a decibel meter mission, but with a vast variation of different types of missions. Examples: beer breaking, slapshot, javelin, high speed driving etc. Pulse specification: pulse grading is in real-time, software reacts directly to operator grading. Animation delay is possible.

2. Effort missions. Goal is to achieve the highest overall effort for a mission. Missions are possible with endless variations of tasks to the audience, from easy to more complex, for example. Examples: basic home team chant, old-time hockey chant, speeding hey, up and down, we will rock you etc. Pulse specification: pulse grading varies by mission, directed to claps, shouts, etc.

3. Direct grade missions. Goal is to achieve the highest grade possible. Example: karaoke. Pulse specification: pulse grading by one direct grade given by the operator, which may be changed as many time as needed during the mission. Final grade is given as counts as the grade for the final score.

4. Lap missions. Goal is to achieve highest amount of laps or rounds. Example: audience wave. Pulse specification: pulse grading by amount of laps, and laps have certain values.

In an embodiment, the memory 206 and the computer program 234 instructions 236 are further configured to, with the processor 102, cause the client apparatus 100: to determine the result for the mission on the basis of the information received via the analyzer input interface 120 coupling a spectator reaction analyzer to the client apparatus 100. As illustrated in FIG. 1, the spectator reaction analyzer may be a sound level meter 142, a spectator motion detection meter 148, and/or spectator motion detection analyzer 148. It is important to notice here that the spectator reaction analyzer may process the raw data (sound and/or motion information) to a more refined form, such as an evaluation of the participation and/or reaction. But, on the other hand, the spectator reaction analyzer may be a simpler device, such as a microphone 144 and/or a video camera 146, whose raw data is further processed within the client apparatus 100, for example.

In the third part 108, the total result for the crowd game is determined on the basis of the results for the missions. In order to enrich the spectator experience, the memory 206 and the computer program 234 instructions 236 may further be configured to, with the processor 102, cause the client apparatus 100: to determine a game period result on the basis of the results for the missions played during the game period. The game period result may be an intermediary result of the total result for the crowd game. On the basis of the game period results, the total result for the crowd game may be determined. In FIG. 1, the total result is displayed 138 on the display device 132: "Total result: Team Finland wins!".

So far, the basic assumption has been that there is one client apparatus 100. In some cases, it may be so that there really is one physical client apparatus 100 for implementing one crowd game. But, this is just one option. The client apparatus 100 may be implemented as a single computer, a distributed client apparatus, a group of computers implementing the structure and functionality of the client apparatus 100, or a group of distributed parts implementing the structure and functionality of the client apparatus 100.

Figure 3:
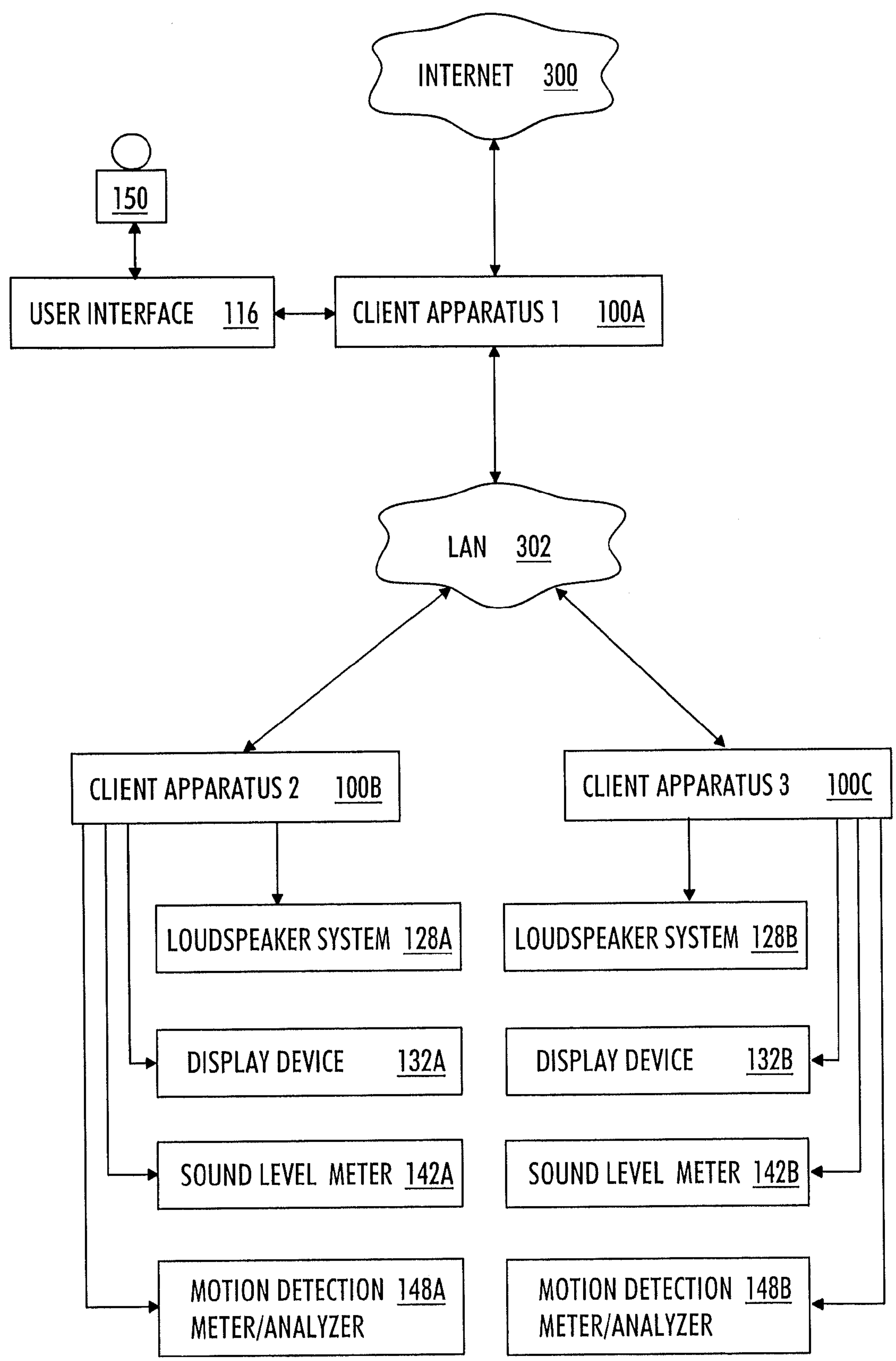

FIG. 3 illustrates one embodiment of distributed client apparatus 100. The client apparatus 100 functionality is divided among three separate apparatuses 100A, 100B, 100C, communicating over local area network (LAN) 302 in a wired and/or wireless fashion. The communication may be implemented over Ethernet, or utilizing radio transceivers such as short-range radio transceivers, for example. In FIG. 3, the first client apparatus 100A runs the main software and the human operator 150 uses its user interface 116. Two other client apparatuses 100B, 100C control the distributed loudspeaker system 128A, 128B, two display devices 132A, 132B, and spectator reaction analyzers 142A, 142B, 148A, 148B, each dedicated to a specific part of the spectator 170 arena.

Besides implementing the client apparatus 100 within one site as one apparatus or a distributed apparatus, the client apparatus 100 may also communicate, over the Internet 300, for example, with other client apparatuses, or with a specific server apparatus. Depending on the scale of the whole system, client apparatuses 100 may communicate with a specific server apparatus, or one client apparatus 100 may also implement the server functionality, in a peer-to-peer network fashion, for example. The system may thus include client apparatuses 100 and a server apparatus.

Figure 4:
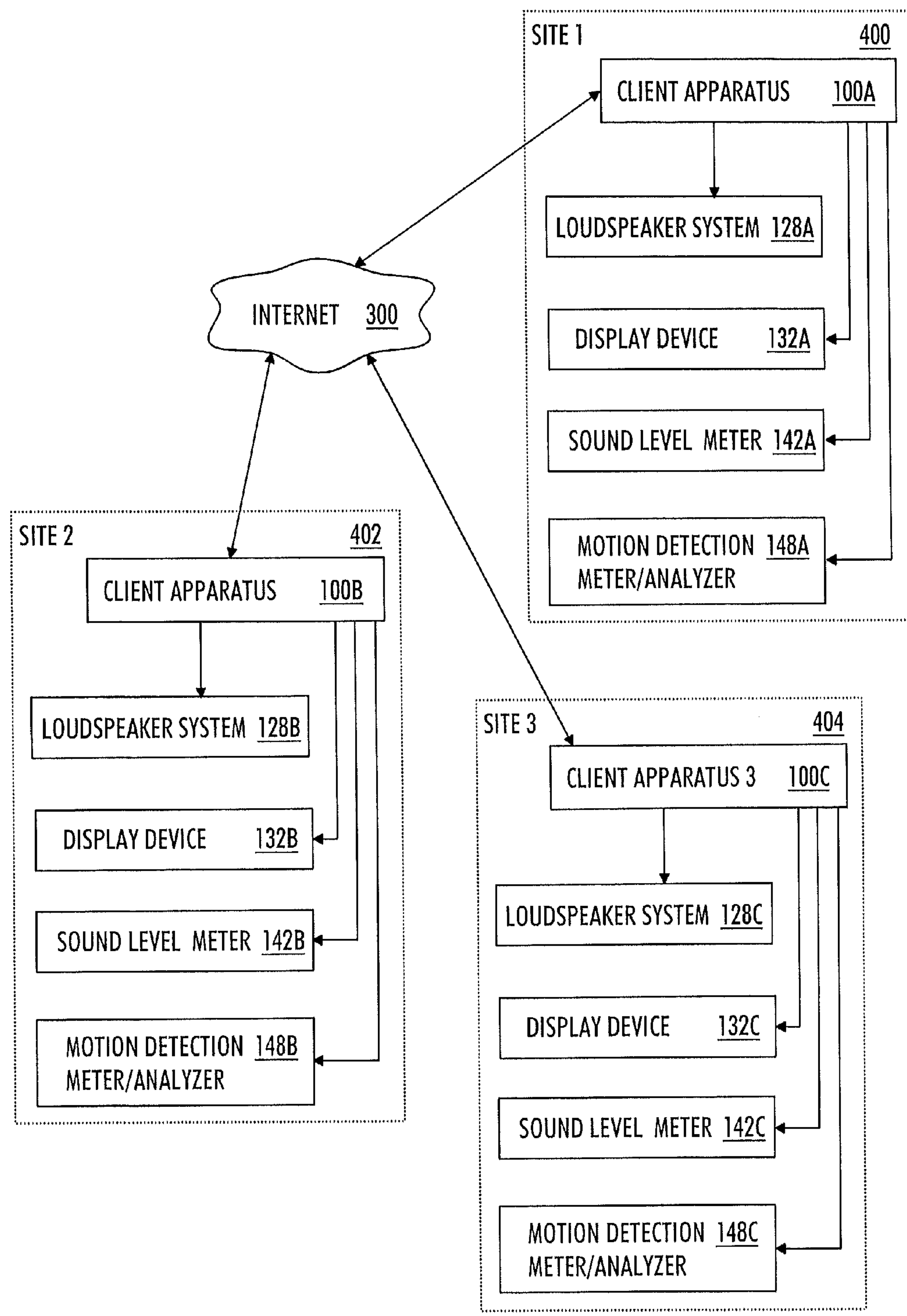

FIG. 4 illustrates three sites 400, 402, 404, each hosting a separate spectator event. Thus, the first site 400 has its own client apparatus 100A controlling the loudspeaker system 128A, the display device 132A, the sound level meter 142A, and the motion detection meter/analyzer 148A. The second site 402 has its own client apparatus 100B controlling the loudspeaker system 128B, the display device 132B, the sound level meter 142B, and the motion detection meter/analyzer 148B. The third site 404 has its own client apparatus 100C controlling the loudspeaker system 128C, the display device 132C, the sound level meter 142C, and the motion detection meter/analyzer 148C. The client apparatuses 100A, 100B, 100C communicate over the Internet 300, or some other suitable standard/proprietary wired/wireless network.

In an embodiment, the client apparatus 100 comprises the communications interface 126 and the memory 206 and the computer program 234 instructions 236 are further configured to, with the processor 102, cause the client apparatus 100: to receive a predetermined mission and/or a crowd game via the communications interface 126 from another apparatus. The idea here is that the entire crowd game or a mission may have been designed in another location, in a centralized manner, for example. The exchange of development results may promote forming of a joint experience. As shown in FIG. 1, such crowd game data 112 and mission data 114 may be stored in the non-volatile memory 110.

The communication between various sites may also promote the joint experience in other ways. In an embodiment, the memory 206 and the computer program 234 instructions 236 are further configured to, with the processor 102, cause the client apparatus 100: to transmit the result for the mission, and/or the total result for the crowd game, and/or data relating to the crowd game via the communications interface 126 to another apparatus. Accordingly, the memory 206 and the computer program 234 instructions 236 may further be configured to, with the processor 102, cause the client apparatus 100: to receive a result for a mission from a crowd game played in another location, and/or a total result for a crowd game played in another location via the communications interface 126 from another apparatus. In this way, the results achieved by the spectators 170 in various locations may be compared, even in real-time if so desired. The server functionality may form from such results comparison information. In an embodiment, the memory 206 and, the computer program 234 instructions 236 are further configured to, with the processor 102, cause the client apparatus 100: to receive comparison information via the communications interface 126 from another apparatus, the comparison information comparing results for missions between different events, between different clubs, and/or between different spectator sports, and/or the comparison information comparing total results for crowd games between different events, between different clubs, and/or between different spectator sports. The game experience is also expanded between different events in different physical locations (arenas). This allows "battle of fans" type of multiplayer and -location game mode, where fans from different cities may compete against each other.

The server apparatus may be implemented in a similar fashion as the client apparatus 100 of FIG. 2. The server apparatus comprises a communications interface 126, a user interface 116, a processor 102, and a memory 206 including computer program 234 instructions 236. The memory 206 and the computer program 234 instructions 236 are configured to, with the processor 102, cause the server apparatus: to design a series of missions forming a crowd game under control of the user interface 116, each mission specifying a task for spectators of an event; and to transmit the crowd game to a second apparatus via the communications interface 126. The second apparatus here refers to the client apparatus 100. In an embodiment, the memory 206 and the computer program 234 instructions 236 are further configured to, with the processor 102, cause the server apparatus: to receive a result for a mission, and/or a total result for a crowd game via the communications interface from the second apparatus; and to transmit the received result for the mission, and/or the result for the crowd game to a third apparatus located at a different site than the second apparatus. The second and third apparatuses here refer to the client apparatuses 100. In an embodiment, the memory 206 and the computer program 234 instructions 236 are further configured to, with the processor 102, cause the server apparatus: to produce comparison information, the comparison information comparing results for missions between different events, between different clubs, and/or between different spectator sports, and/or the comparison information comparing total results for crowd games between different events, between different clubs, and/or between different spectator sports.

The described crowd game may be implemented as the Uplause Entertainment System comprising: missions (such as crowd games), clients 100, moderator tools, distribution system, asset management system, reporting and statistics system, and crowd game (mission) development kit. The crowd game creates a brand new and unique MMCPG (Massively Multiplayer Crowd Playing Game) genre within the games industry. The main idea is that everyone can play. Based on the performance and participation in single game missions and levels, points, results and high scores will be provided and eventually also rewards and/or prizes may be given to everyone. It is possible that as many as tens of thousands of people may be playing the same game simultaneously, meaning that lots of game design attention has been put to the scoring system so that it is intuitive, responsive and rewarding. The game design enables in-game advertising through promotional placements. The games are designed to be easy to pick and access but will offer unlimited depth to further improve scores and compare performance against leaderboards and all time high scores.

The client instance contains the selected missions and the control panel application to manage the missions.

In addition, a client software component exists for the purpose of sending mission results to the backend system, and for a multisite event to retrieve/receive results from missions executed on other sites related to the event or tournament.

The purpose of the moderator tools are: create and manage missions, create and manage events, create and manage clients, generate client instances (build or rebuild a client for an event), create and manage feeds, and generate reports.

The system requires interfaces for: receiving data records from clients at specific events; sending data records from one client to other clients (i.e., update sites information), external data feeds, internal data feed (monitoring dashboard), event organizer reporting statistics, and internal reporting and statistics.

The purpose of the receive data records interface is for centrally collecting mission data results from client systems at specific events.

The client instance specific contents may be encrypted by the client (using a client-specific private key) before sending it to the server. The server will decrypt the contents using a client specific public key.

The purpose of the send data records interface is in a multi-site event for sending/providing other sites' comparative mission data results.

The site-specific contents may be encrypted by the server (using a server-specific private key) before sending it to the client instances associated with a specific event. The clients will decrypt the contents using a server specific public key.

If the contents are to be sent to client instance specific queues, then the contents may be encrypted by the server using a client-specific public key, instead. The clients will then decrypt the contents using a client specific private key.

The purpose of the external data feeds interfaces is to provide mechanism to provide both formatted (HTML, RSS, Atom, for example) and unformatted (XML or even binary, for example) data feeds regarding the progress of a particular event.

There may be multiple external data feeds with different characteristics/attributes.

Access to a particular data feed may be public or authenticated (only specific users/systems may receive the feed).

The purpose of the event organizer reporting interface is to provide event reporting and statistics data for reporting purposes after the event.

The purpose of the system reporting interface is to provide full and complete access to all data and statistics in the system for internal reporting purposes.

This interface also allows the creation of a real-time or semi-real time monitoring "dashboard" of the entire system.

Figure 5:
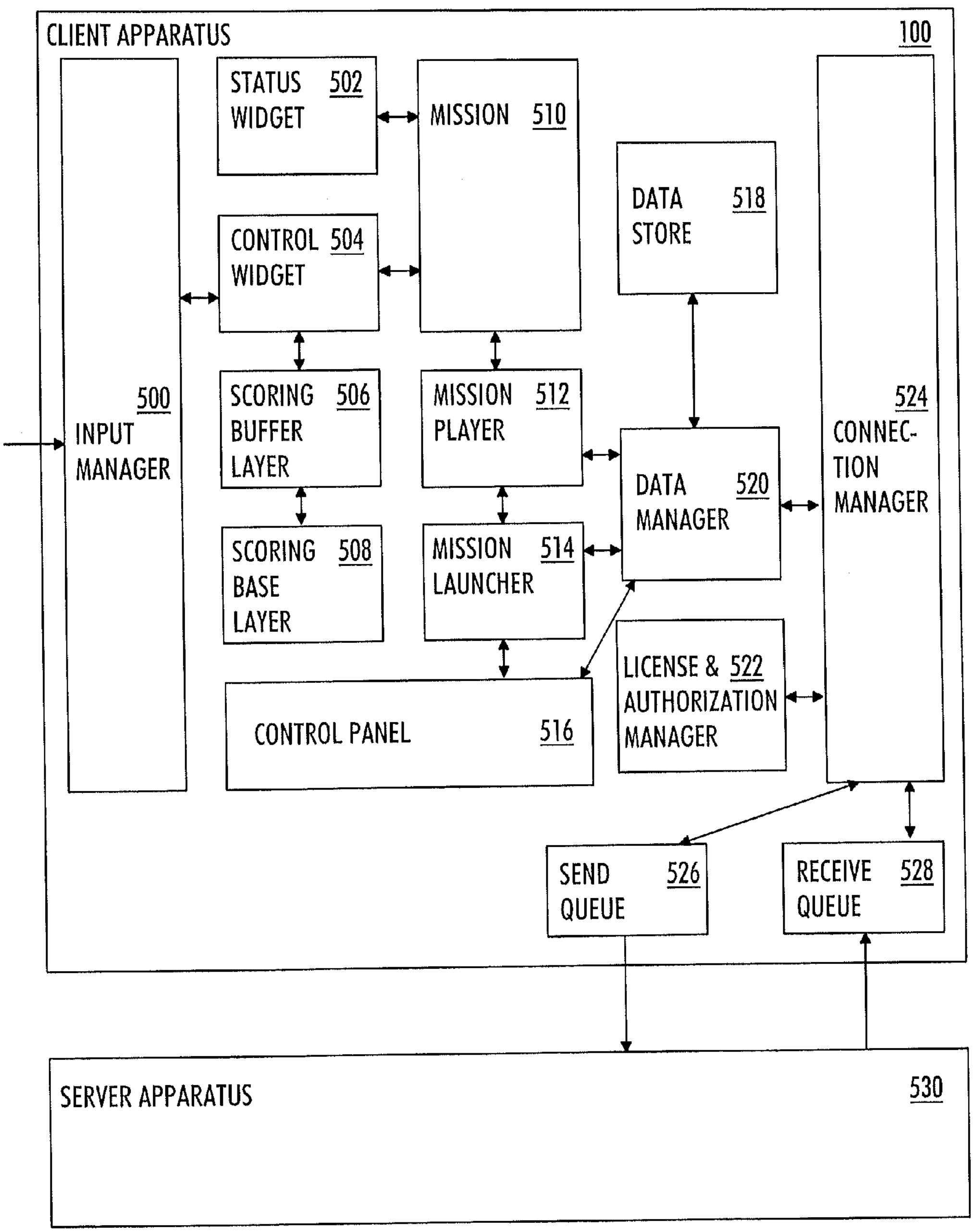

With reference to FIG. 5, the client 100 software architecture in the Uplause Entertainment System will be described.

Stateless request/response protocol between components/modules is represented by dual arrows in the architecture diagram. Unidirectional data/command/control is represented by a single arrow. For simplification purposes, some connections (arrows) have been omitted from the architecture diagram (each functional component/module may be communicating with a license & authorization manager component/module 522, for example). Input sources, coming to an input manager 500, analog or digital, may be things such as keyboard/mouse that the client software operates on, or external analog or digital sensors (dB meters, video cameras/feeds, etc.).

An individual mission 510 comprises mission-specific components as shown in FIG. 9. More than one mission 510 might be executing (running) at the same time (a game and a separate audio clip, for example). Simultaneously executing missions 510 are restricted to specific types and combinations of missions.

A mission player 512 is responsible for managing the execution of an individual and specific type of a mission 510. The mission player 512 may be integrated into the executable mission 510 as a subcomponent/subroutine, or it might be a separate component/module. Specific mission player 512 components are required for handling specific types of missions, such as: animation, video clip, audio clip, game, event status, leaderboard etc.

All activity/events are also logged through a data manager 520 component/module, as are mission specific results/scores (if any).

A mission launcher 514 is a client service component/module. Its task is to launch all individual missions 510 and their status, as well as communications with a control panel 516.

The mission launcher 514 also isolates the control panel 516 from mission type specific implementations, and also provides' for potential support for multiple computers managing multiple missions at a single event.

All activity/events are also logged through the data manager 520.

A scoring buffer layer 506 is a mission type specific scoring abstraction/conversion layer.

A scoring base layer 508 is a foundation layer of the scoring system.

A control widget 504 is a mission specific control widget that exposes adjustable parameters and general mission controls via the control panel 516. The control panel 516 only provides a frame/sub-window area for the mission specific control widget 504 to represent itself.

A status widget 502 is a mission specific widget that exposes the widget's running status (e.g., current score, if applicable, etc.) via the control panel 516. The control panel 516 only provides a frame/sub-window area for the mission specific status widget 502 to represent itself.

The control panel 516 is the event operator's tool to manage the execution of individual missions 510.

An input manager 500 is a component/module that receives and manages/routes all input to the relevant components/functions of the client 100.

Typical input may be generated via the mouse/keyboard on the computer that the client runs on, but also external analog or digital inputs (such as sensors, or video feeds may be applicable depending on the supported missions and/or the event venue).

A data store 518 is local data storage (event log, mission scores, client configuration, mission configuration, etc.). The data store 518 may be implemented as one or multiple relational databases and/or individual data files.

A data manager 520 is a component/module that is responsible for saving/storing any data locally (whether client system or mission specific, or received from the backend). If applicable, it is also responsible for relevant object relational mapping (ORM). It is also responsible for sending the client generated data to the backend. The client and backend communication is handled via a connection manager 524.

The connection manager 524 is a component/module that manages the communication between the client and the backend.

The communication between the client and backend takes place by using an asynchronous message passing/queueing mechanism.

The connection manager 524 is also responsible for providing the control panel 516 status information regarding backend connectivity.

A send queue 526 receives the messages that the client wishes to transmit to the backend. The queueing system confirms to the connection manager 524 when a backend message has been accepted into the queue (or when one has not been accepted, and in that case why). The send queue 526 depends on corresponding message queueing software residing on both the client as well as the backend side.

A receive queue 528 receives messages that the backend wishes to transmit to the client. The receive queue 528 depends on corresponding message queueing software residing on both the client as well as the backend side.

Figure 6:
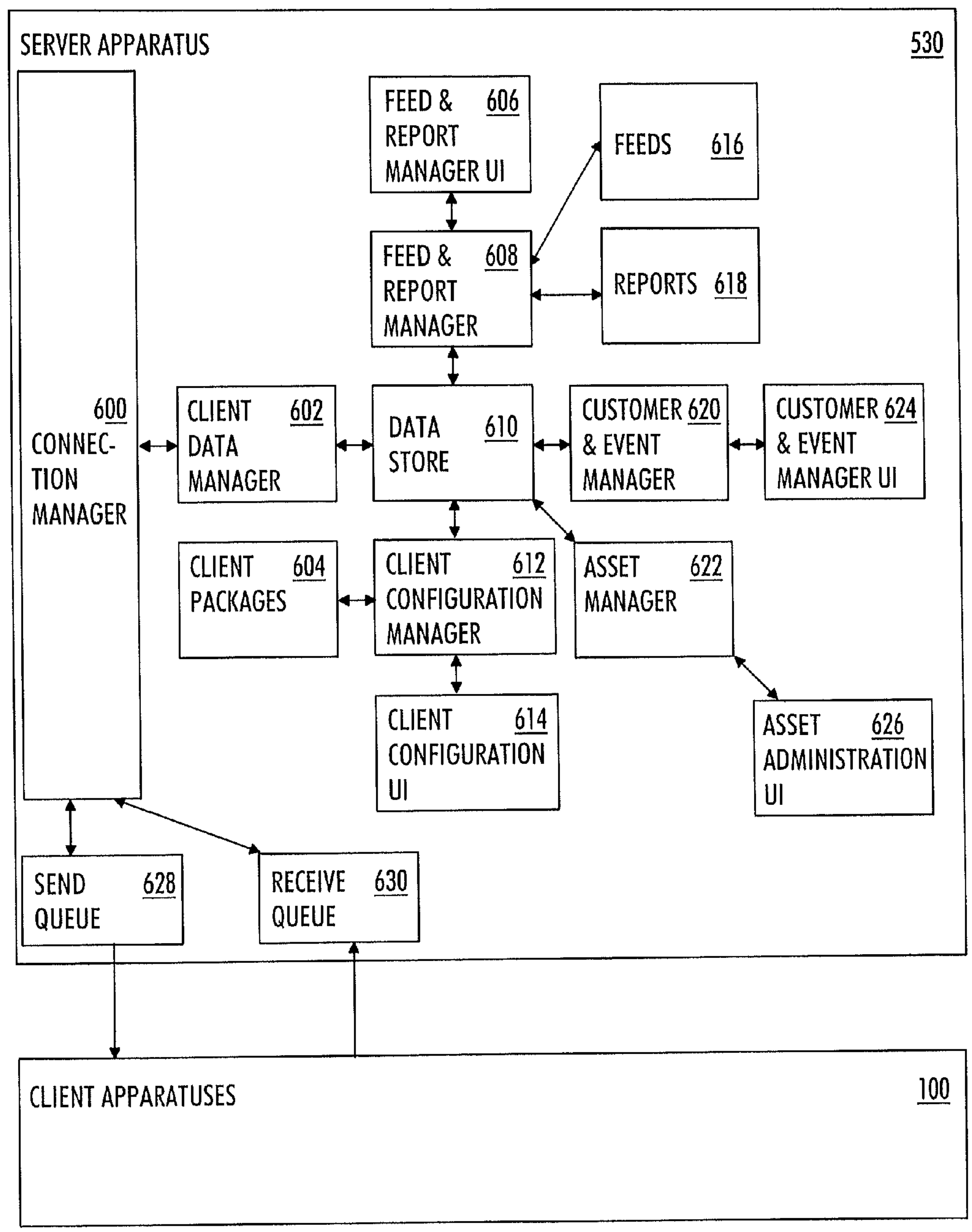
FIGS. 6 and 7 illustrate embodiments of a server apparatus.

With reference to FIG. 6, the server (or backend) 530 software architecture in the Uplause Entertainment System will be described.

The server manages client configurations, customers/clients, events, reporting, external data feeds, etc. It also, in a multi-site event situation acts as the relay and storage for site-specific event results, which other clients related to the event at other sites are to receive and use. In addition, the backend is also providing a means for updating content at the client side.

Outputs are internal as well as external (customers/partners and public consumers) web feeds and reports, and client packages, which represent customer/event/venue specific client installation packages and updates to existing (delivered/installed) clients.

A connection manager 600 is a component/module that manages the communication between the backend and the clients.

The communication between the backend and clients takes place by using an asynchronous message passing/queueing mechanism.

The connection manager 600 is also responsible for providing the status information regarding client connectivity.

A send queue(s) 628 receive the messages that the backend wishes to transmit to the clients. The queueing system confirms to the connection manager 600 when a backend message has been accepted into the queue (or when one has not been accepted, and in that case why). The send queue 628 depends on corresponding message queueing software residing on both the client as well as the backend side.

A receive queue(s) 630 receives messages that the clients wish to transmit to the backend. The receive queue 630 depends on corresponding message queueing software residing on both the client as well as the backend side.

Clients 100 contain the software and associated content for managing/executing individual missions at a specific event/venue. Event statistics are transmitted to the backend, and as appropriate, the backend may transmit updates and data from other events/venues to clients.

A data store 610 is local data storage (event logs, client configurations, mission configurations, events, venues, customers, etc.). The data store 610 may be implemented as one or multiple relational databases and/or individual data files.

The purpose of a client data manager 602 is to contain the business logic regarding backend communication between the clients. It has full access to the relevant data in the data store 610 for this purpose.

A feed and report manager 608 contains the business logic (including possible feed/report specific modules for managing different output types).

Subcomponents in the feed and report manager 608 may be: a module/function to generate public RSS feeds of the Uplause Entertainment System data/statistics (all public data or event/venue specific data); a module/function for generating a statistical report (Excel spreadsheet, Adobe PDF document, etc.) that shows mission and ad results, execution times, exposure etc.; and a web widget that besides just the data, provides a complete feed user interface that may be embedded/placed on a web site (uplause.com, or an associate's web site), for example The number of possible feeds 616 and reports 618 is not limited by the system. The configuration details and properties of individual feeds and reports, as well as the related raw data, are stored in the data store 610.

The feed and report manager 608 exposes an API (Application Programming Interface) that allows for either programmatic/batch access to its functions, and for the generation of a management user interface.

A feed and report manager user interface 606 provides a (web/browser based) mechanism for a user to manage available feeds and their visibility/state, as well as generate defined reports, or—depending on the implementation—also generate new reports.

The feed and report manager user interface 606 is implemented over the feed and report manager API.

A client configuration manager 612 contains the business logic for generating installable client packages 604, which in essence contain the required software and relevant configuration data and content for installing a new instance of the client 100 for a specific customer/event/venue.

The client configuration manager 612 exposes an API that allows for either programmatic/batch access to its functions, and for the generation of a management user interface.

A client configuration user interface 614 provides a (web/browser based) mechanism for a user to manage available/ existing clients, to generate/build new client packages 604. The client configuration user interface 614 is implemented over the client configuration manager API.

A customer and event/venue manager 620 contains the business logic for maintaining the client/customer data, as well as event/venue data.

The customer and event/venue manager 620 exposes an API that allows for either programmatic/batch access to its functions, and for the generation of a management user interface.

A customer and event/venue manager user interface 624 provides a (web/browser based) mechanism for a user to manage client, event and venue data.

The customer and event/venue manager user interface 624 is implemented over the customer and event/venue manager API.

An asset manager 622 contains the business logic for maintaining the various system assets (mission files/components such as animations, games, audio clips, video clips, logos, etc.).

The asset manager 622 exposes an API that allows for either programmatic/batch access to its functions, and for the generation of a management user interface.

An asset administration user interface 626 provides a (web/browser based) mechanism for a user to manage system assets. The asset administration user interface 626 is implemented over the asset manager API.

A data store 610 represents the backend database(s) used to drive the client generation, store logs and statistics, as well as all the customer/client, event and venue data, as well as all other relevant information.

Figure 8:
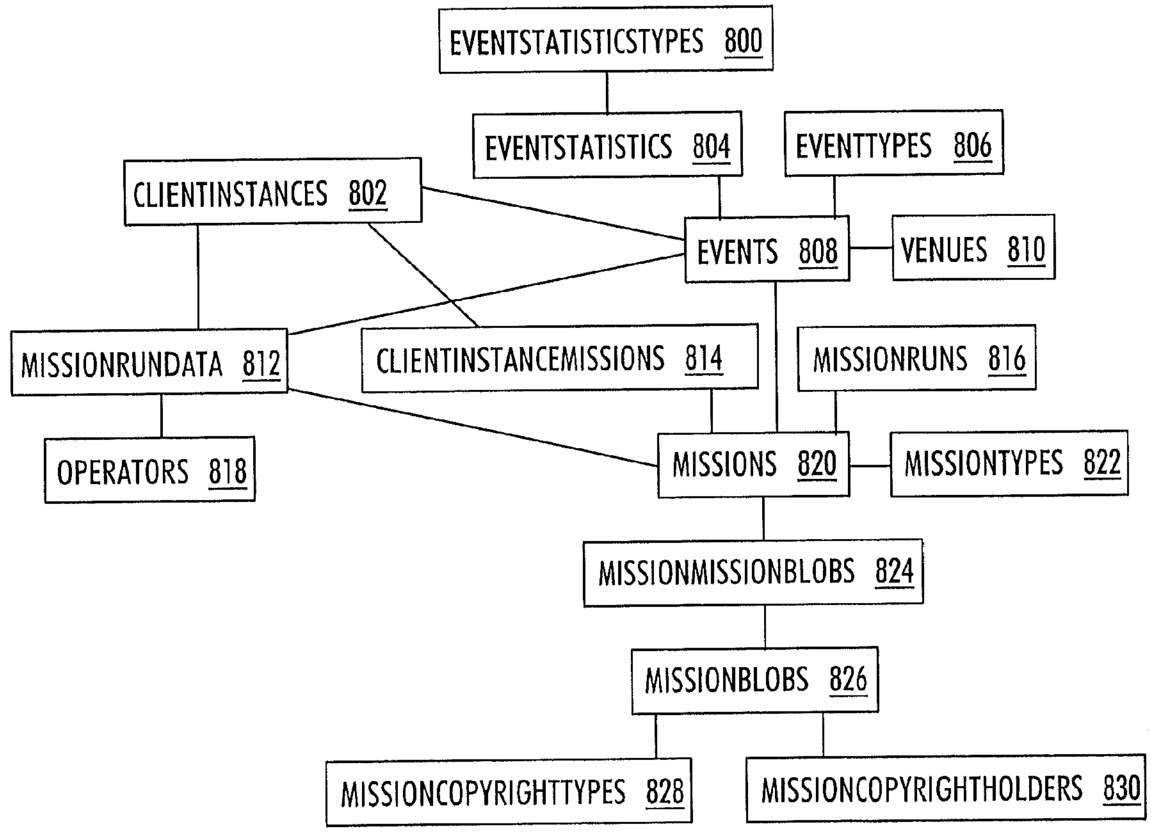
FIG. 8 illustrates a data store diagram of the server apparatus.

With reference to FIG. 8, data structures of the backend data store 610 are described. There are two main parts: mission run data (client to server), and asset management (server storage).

Mission run data includes MissionRunData 812. MissionRunData 812 represents the data record of an executed mission by a specific client at a specific event. The data will be sent also to the central server after execution (queued mode).

MissionRunData 812 has:

ClientInstanceID,

MissionID,

EventID,

OperatorID,

MissionVersion,

MissionRunDataSequence,

MissionRunDataResultTypeID,

Mission Run Data ResultValue,

MissionRunDataStartTimestamp,

MissionRunDataEndTimestamp,

MissionRunDataClientUTCTime, and

MissionRunDataSuccessIndicator.

Asset management includes missions, events, and entertainment system clients.

Missions include MissionTypes 822, Missions 820, MissionBLOBs 826, MissionMissionBLOBs 824, MissionCopyrightTypes 828, MissionCopyrightHolders 830, and MissionRuns 816.

MissionTypes 822 categorize (classify) different types/classes of missions that may be treated differently depending on the case (e.g., game vs. video clip).

MissionTypes 822 has:

MissionTypeID (unique identifier),

MissionTypeName, and

MissionTypeDescription.

Missions 820 has:

MissionID (unique identifier),

MissionTypeID,

MissionParentID,

EventID,

MissionName,

MissionShortName,

MissionNameAbbreviation,

MissionDescription,

MissionVersion,

MissionLocaleCode, and

MissionNumberOfRounds.

MissionBLOBs 826 either store or point to individual assets that a mission consists of.

MissionBLOBs 826 has:

MissionBLOBID (unique identifier),

MissionBLOBName,

MissionBLOBCreationTimestamp,

MissionBLOBModificationTimestamp,

MissionBLOBVersion,

MissionBLOBLocaleCode,

MissionBLOBCopyrightTypeID,

MissionBLOBCopyrightHolderID, MissionBLOBContents (typically a file, an archive file or pointer to a file or an archive), and MissionBLOBFingerprint.

MissionMissionBLOBs 824 keep track of individual elements (e.g., files) related to a specific mission (the assets that a mission consists of).

MissionMissionBLOBs 824 has:

MissionID, and

MissionBLOBID.

MissionCopyrightTypes 828 has:

MissionCopyrightTypeID,

MissionCopyrightName,

MissionCopyrightDescription, and

MissionCopyrightRightsHolderID.

MissionCopyrightHolders 830 has:

MissionCopyrightHolderID, and

MissionCopyrightEtc.

MissionRuns 816 are records of mission executions and related data (time/length, results, etc.).

MissionRuns 816 has:

MissionRunID (unique identifier),

MissionID,

MissionRunSequence,

MissionRunStartTimestamp,

MissionRunEndTimestamp, MissionSuccessIndicator (true or false),

MissionResultTypeID,

MissionResultValue,

MissionOriginal (true or false), and

MissionOriginalID (original mission MissionID).

Events include EventTypes 806, Events 808, EventStatistics Types 800, EventStatistics 804, Venues 810, and Operators 818.

EventTypes 806 identify specific types/classes of events. A single event, such as one unique concert or sports event, or it may represent a long event or tournament, or an entire season consisting of numerous games/competitions/concerts, etc.

EventTypes 806 has:

EventTypeID (unique identifier),

EventTypeName,

EventTypeDescription,

EventVersion, EventSingle (true or false),

EventTournament (true or false),

EventSeasonSingle (true or false), EventSeasonMulti (true or false), and

EventPerpetual (true or false).

Events 808 identify a specific and unique event (that may last only hours, days or even weeks/months in the case of a long event or tournament). An event may happen in a single location or multiple locations.

Events 808 has:

EventID (unique identifier),

EventTypeID,

VenueID,

EventName,

EventDescription,

EventLocationCity,

EventLocationCountry,

EventOrganizerName,

EventStartTimestamp,

EventEndTimestamp, and

EventAgreementID (to associate with legal agreements/contracts).

EventStatisticsTypes 800 has:

EventStatisticsTypeID,

EventStatisticsName, and

EventStatisticsDescription.

EventStatistics 804 has:

EventStatisticsID,

EventStatisticsTypeID, EventID, and

EventStatisticsValue.

Venues 810 has:

VenueID,

VenueName, and etc. (relevant data required for a specific venue/site).

Operators 818 has:

OperatorID,

OperatorUsername,

OperatorFullNameFirst,

OperatorFullNameLast,

OperatorContactEmail, and

OperatorContactPhone.

Entertainment system clients execute individual missions through the operator commands issued through the control panel application, and they include ClientInstances 802 and ClientInstanceMissions 814. The ClientInstances 802 identify all that encompasses a single client instance (single personal computer at an event site) and related attributes.

ClientInstances 802 has:

ClientInstanceID (unique identifier),

ClientInstanceSequence (if multiple active at event),

ClientInstanceName,

EventID,

ClientInstancePrivateKey (for encryption/decryption),

ClientInstancePublicKey (for encryption/decryption),

ClientInstanceServerPublicKey (for encryption/decryption),

ClientInstanceValidityFromTimestamp,

ClientInstanceValidityToTimestamp,

ClientInstanceSendQueueID, and

ClientInstanceReceiveQueueID.

ClientInstanceMissions 814 tie together the entire set of applicable missions for a specific client instance (and related event).

ClientInstanceMissions 814 has:

ClientInstanceID, and

MissionID.

Figure 7:
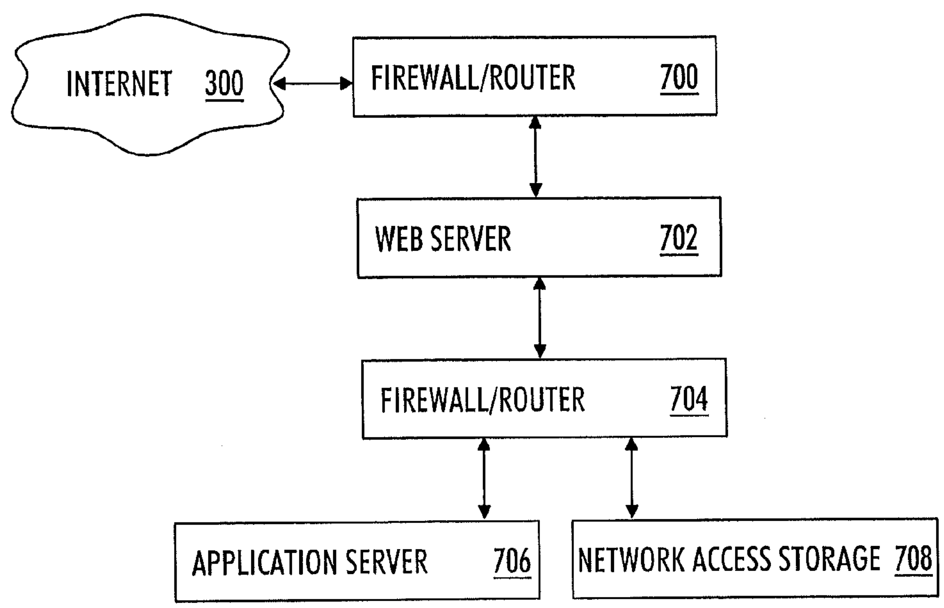

Client/server communications may be implemented via a reliable mechanism/system such as the ActiveMQ message queue, for example. Backend storage may be implemented with MySQL or Postgre-SQL, for example. FIG. 7 illustrates one way to implement the server functionality: a web server 702 connected to the Internet 300 through a firewall/router 700, and a separate application server 706 and network access storage 708 protected by another firewall/router 704.

Figure 10:
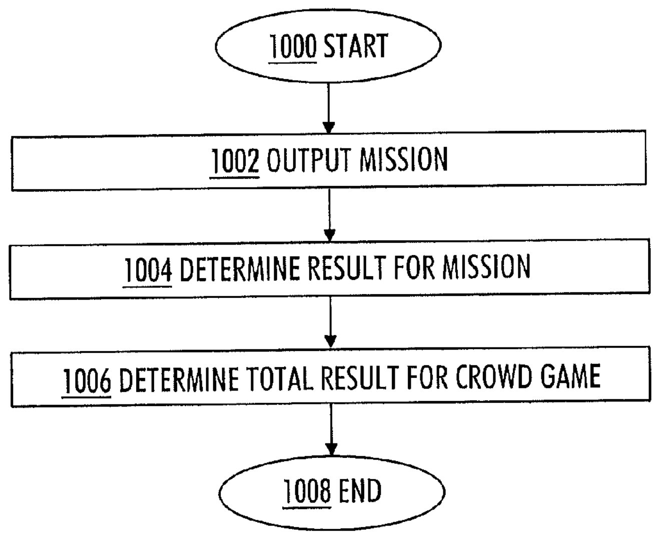
FIG. 10 illustrates a method.

Next, a method will be described with reference to FIG. 10. The operations are in no absolute chronological order, and some of the operations may be performed simultaneously or in an order differing from the given one. Other functions, not described in this application, may also be executed between the operations or within the operations. Some of the operations or parts of the operations may also be left out or replaced by a corresponding operation or part of the operation. The method starts in 1000. In 1002, a series of missions forming a crowd game is outputted to a display device, each mission specifying a task for spectators of an event. In 1004, a result for a mission is determined on the basis of participation and/or reaction by the spectators for the task. In 1006, a total result for the crowd game is determined on the basis of the results for the missions. The method ends in 1008. The embodiments of earlier described client apparatus 100 and/or server apparatus 530 may also be used to enhance the method.

It will be obvious to a person skilled in the art that, as technology advances, the inventive concept can be implemented in various ways. The invention and its embodiments are not limited to the examples described above but may vary within the scope of the claims.

The invention claimed is:

1. A client apparatus comprising a processor, and a memory including computer program instructions, the memory and the computer program instructions being configured to, with the processor, cause the apparatus:

to output a series of missions forming a crowd game to a display device, each mission specifying a task for at least one group of spectators attending a spectator event;

to determine a result for a mission on the basis of participation and/or reaction by the at least one group of spectators for the task to a comparative mission performed by at least one other group of spectators attending the spectator event and/or another spectator event;

to determine a total result for the crowd game on the basis of the results for the missions; and to output comparison information to the display device, the comparison information comparing results for missions between the at least one group of spectators and the at least one other group of spectators attending the spectator event or different spectator events, and/or the comparison information comparing total results for crowd games between the at least one group of spectators and the at least one other group of spectators attending the spectator event or different spectator events.

2. The apparatus of claim 1, wherein the participation and/or reaction by the at least one group of spectators comprise sounds generated by the spectators, body movements of the spectators, body part movements of the spectators, and/or handling of accessories by the spectators.

3. The apparatus of claim 1, wherein the memory and the computer program instructions are further configured to, with the processor, cause the apparatus:

to determine the result for the mission in such a manner that a human operator sets the result with the user interface on the basis of observing the participation and/or reaction by the at least one group of spectators.

4. The apparatus of claim 3, further comprising a pulse-based scoring user interface, and the memory and the computer program instructions are further configured to, with the processor, cause the apparatus:

to receive scores in such a manner that the human operator rates the participation and/or reaction by the at least one group of spectators with scores during the mission in real-time with the pulse-based scoring user interface; and to determine the result for the mission on the basis of the scores for the mission.

5. The apparatus of claim 4, wherein the spectator reaction analyzer comprises a sound level meter, and/or a spectator motion detection meter, and/or spectator motion detection analyzer.

6. The apparatus of claim 1, further comprising an analyzer input interface coupling a spectator reaction analyzer to the apparatus, and the memory and the computer program instructions are further configured to, with the processor, cause the apparatus:

to determine the result for the mission on the basis of the information received via the analyzer input interface from the spectator reaction analyzer.

7. The apparatus of claim 1, wherein the memory and the computer program instructions are further configured to, with the processor, cause the apparatus: to determine a game period result on the basis of the results for the missions played during the game period.

8. The apparatus of claim 1, wherein the memory and the computer program instructions are further configured to, with the processor, cause the apparatus:

to output together with the mission an advertisement relating to a brand and/or a product and/or a service to the display device.

9. The apparatus of claim 1, further comprising a sound output interface to a loudspeaker system, and the memory and the computer program instructions are further configured to, with the processor, cause the apparatus:

to output sound information relating to the mission to the loudspeaker system.

10. The apparatus of claim 9, wherein the memory and the computer program instructions are further configured to, with the processor, cause the apparatus:

to fetch the sound information from a prerecorded file.

11. The apparatus of claim 1, further comprising a communications interface and the memory and the computer program instructions are further configured to, with the processor, cause the apparatus:

to receive a predetermined mission and/or a crowd game via the communications interface from another apparatus.

12. The apparatus of claim 1, further comprising a communications interface and the memory and the computer program instructions are further configured to, with the processor, cause the apparatus:

to transmit the result for the mission, and/or the total result for the crowd game, and/or data relating to the crowd game via the communications interface to another apparatus.

13. The apparatus of claim 1, further comprising a communications interface and the memory and the computer program instructions are further configured to, with the processor, cause the apparatus:

to receive a result for a mission from a crowd game played in another location, and/or a total result for a crowd game played in another location via the communications interface from another apparatus.

14. The apparatus of claim 1, further comprising a communications interface and the memory and the computer program instructions are further configured to, with the processor, cause the apparatus:

to receive the comparison information via the communications interface from another apparatus.

15. The apparatus of claim 1, further comprising a video output interface to the display device, and a user interface, and the memory and the computer program instructions are further configured to, with the processor, cause the apparatus:

to output the series of missions forming the crowd game to the display device under control of the user interface and via the video output interface.

16. The apparatus of claim 1, wherein the apparatus comprises a single computer, or a distributed apparatus, or a group of computers implementing the structure and functionality of the apparatus, or a group of distributed parts implementing the structure and functionality of the apparatus.

17. A server apparatus comprising a communications interface, a user interface, a processor, and a memory including computer program instructions, the memory and the computer program instructions being configured to, with the processor, cause the apparatus:

to design a series of missions forming a crowd game under control of the user interface, each mission specifying a task for a group of spectators attending a spectator event;

to transmit the crowd game to a first client apparatus in a first location, and to a second client apparatus in a second location via the communications interface, each of the first and second locations having at least one group of spectators;

to receive a result for a mission, and/or a total result for a crowd game via the communications interface from both the first client apparatus and the second client apparatus, the result for the mission and/or the total result of the crowd game determined by comparison of participation and/or reaction of each of the at least one group of spectators attending the spectator events at the first and second locations;

to produce comparison information on the basis of the result for the mission and/or the total result for the crowd game received from both the first client apparatus and the second client apparatus, the comparison information comparing results for missions between the at least one group of spectators attending the spectator events at the first and second locations or different spectator events, and/or the comparison information comparing total results for crowd games between the at least one group of spectators attending the spectator event at the first and second locations or different spectator events; and to transmit the comparison information via the communications interface to the first client apparatus and/or to the second client apparatus.

18. A system comprising a first client apparatus, a second client apparatus, and a server apparatus, comprising:

the server apparatus comprising:

means for designing a series of missions forming a crowd game under control of the user interface, each mission specifying a task for at least one group of spectators attending an event at the first and second locations; and means for transmitting the crowd game to the first client apparatus in a first location, and the second client apparatus in a second location;

means for receiving a result for a mission, and/or a total result for a crowd game from both the first client apparatus and the second client apparatus, the result for the mission and/or the total result of the crowd game determined by comparison of participation and/or reaction of each of the at least one group of spectators attending the events at the first and second locations;

means for producing comparison information on the basis of the result for the mission, and/or the total result for the crowd game received from both the first client apparatus and the second client apparatus, the comparison information comparing results for missions between the at least one group of spectators attending the events at the first and second locations or different spectator events, and/or the comparison information comparing total results for crowd games between the at least one group of spectators attending the events at the first and second locations or different spectator events;

means for transmitting the comparison information to the first client apparatus and/or the second client apparatus;

the first client apparatus comprising:

means for receiving the crowd game from the server apparatus;

means for outputting the series of missions forming the crowd game to a display device at the first location;

means for determining a result for a mission on the basis of participation and/or reaction by the at least one group of spectators for the task at the first location;

means for determining a total result for the crowd game on the basis of the results for the missions;

means for transmitting the result for the mission, and/or the total result for the crowd game, and/or data relating to the crowd game to the server; and means for receiving the comparison information from the server; and the second client apparatus comprising:

means for receiving the crowd game from the server apparatus;

means for outputting the series of missions forming the crowd game to a display device at the second location;

means for determining a result for a mission on the basis of participation and/or reaction by the at least one group of spectators for the task at the second location;

means for determining a total result for the crowd game on the basis of the results for the missions;

means for transmitting the result for the mission, and/or the total result for the crowd game, and/or data relating to the crowd game to the server; and means for receiving the comparison information from the server.

19. A method comprising:

outputting a series of missions forming a crowd game to a display device, each mission specifying a task for at least one group of spectators attending a spectator event;

determining a result for a mission on the basis of participation and/or reaction by the at least one group of spectators for the task to a comparative mission performed by at least one other group of spectators attending the spectator event and/or another spectator event;

determining a total result for the crowd game on the basis of the results for the missions; and outputting comparison information to the display device, the comparison information comparing results for missions between the at least one group of spectators and groups of spectators attending the event or different spectator events, and/or the comparison information comparing total results for crowd games between the at least one group of spectators and groups of spectators attending the event or different spectator events.

20. A non-transitory computer-readable storage medium comprising computer program instructions which, when loaded into an apparatus, cause the apparatus:

to output a series of missions forming a crowd game to a display device, each mission specifying a task for at least one group of spectators attending a spectator event;

to determine a result for a mission on the basis of participation and/or reaction by the at least one group of spectators for the task to a comparative mission performed by at least one other group of spectators attending the spectator event and/or another spectator event;

to determine a total result for the crowd game on the basis of the results for the missions; and to output comparison information to the display device, the comparison information comparing results for missions between the at least one group of spectators and groups of spectators attending the event or different spectator events, and/or the comparison information comparing total results for crowd games between the at least one group of spectators and groups of spectators attending the event or different spectator events.

* * * * *